United States Patent
Teramoto et al.

(10) Patent No.: US 6,844,967 B2
(45) Date of Patent: Jan. 18, 2005

(54) SCREEN UNIT AND DISPLAY SYSTEM

(75) Inventors: Kohei Teramoto, Tokyo (JP); Yasuo Sato, Tokyo (JP); Yoshinori Sakakibara, Hiroshima (JP)

(73) Assignees: Mitsubishi Denki Kabushiki Kaisha, Tokyo (JP); Nishinihon-Denken Inc., Hiroshima (JP)

( * ) Notice: Subject to any disclaimer, the term of this patent is extended or adjusted under 35 U.S.C. 154(b) by 285 days.

(21) Appl. No.: 10/101,617

(22) Filed: Mar. 21, 2002

(65) Prior Publication Data

US 2003/0179449 A1 Sep. 25, 2003

(51) Int. Cl.[7] .......................... G03B 21/56; G03B 21/60
(52) U.S. Cl. ................ 359/443; 359/449; 359/454; 359/459
(58) Field of Search ................ 359/443, 449, 359/454, 459

(56) References Cited

U.S. PATENT DOCUMENTS

| 1,934,802 A | 11/1933 | Hitchcock | 359/450 |
| 3,507,548 A | 4/1970 | Hoffman et al. | 359/443 |
| 5,699,131 A * | 12/1997 | Aoki et al. | 348/832 |
| 6,577,355 B1 * | 6/2003 | Yaniv | 349/16 |
| 6,590,548 B1 * | 7/2003 | Mizutani et al. | 345/32 |

FOREIGN PATENT DOCUMENTS

| EP | 0 752 613 A2 | 1/1997 | |
| FR | 2 511 516 A | 2/1983 | |
| FR | 2 657 701 A | 8/1991 | |
| FR | 2657701 A1 * | 8/1991 | ........... G03B/21/60 |
| JP | 11072851 | 3/1999 | |
| JP | 2000-171903 A | 6/2000 | |
| JP | 2000-180966 A | 6/2000 | |
| JP | 2001-154274 A | 6/2001 | |

* cited by examiner

*Primary Examiner*—Rodney Fuller
*Assistant Examiner*—Magda Cruz
(74) *Attorney, Agent, or Firm*—Birch, Stewart, Kolasch & Birch, LLP.

(57) ABSTRACT

A screen unit includes a semipermeable screen sheet sandwiched between a first transparent sheet and a second transparent sheet. The semipermeable screen sheet transmits and reflects a projected image in a constant percentage. The first transparent sheet such as an acrylic sheet wider than the semipermeable screen sheet. The second transparent sheet is the same as the first transparent sheet.

15 Claims, 7 Drawing Sheets

SCREEN UNIT AND DISPLAY SYSTEM

BACKGROUND OF THE INVENTION

1. Field of the Invention

This invention relates to a screen unit and a display system in an image projection display.

2. Description of the Related Art

Hitherto, a projected image from a video projector has been projected onto a screen unit and has been reflected or transmitted, whereby the observer has viewed the image. In the screen unit, the semipermeable screen sheet itself has predetermined reflectivity and transmissivity. The semipermeable screen is thin and has no mechanical strength. Thus, the semipermeable screen has been bonded fully onto a transparent reinforcing sheet and has been covered in surroundings with a frame for use. Thus, it has been intricate to adjust the video projector to match the image and the frame of the screen unit.

In the screen unit in the related art as described above, the screen sheet providing the image projection face is easily bent because of the thermal expansion coefficient difference between the screen sheet and the reinforcing transparent sheet. Since the frame touches the screen sheet, adjustment for matching the image with the frame is intricate. Further, in the display system in the related art as described above, when the observer facing one display face of the screen unit simultaneously displaying a reflected image and a transmitted image goes round to the back, the front and the back of the image are reversed; this is a problem.

SUMMARY OF THE INVENTION

It is therefore a first object of the invention to provide a screen unit with flatness not impaired by the temperature difference. It is a second object of the invention to provide a screen unit for making it possible to easily adjust the outline of an image. It is a third object of the invention to provide a display system for projecting an image fitted to viewing of observers.

According to the invention, there is provided a screen unit including a screen sheet; and a first transparent sheet and second transparent sheet, each wider than the screen sheet. The screen sheet is sandwiched between the first transparent sheet and second transparent sheet.

The semipermeable screen sheet can be prevented from being bent due to a temperature, an image occupying the full semipermeable screen sheet can be projected easily, and the visual effect as if the image floated in the air is provided.

According to the invention, there is provided a display system including a screen unit including a semipermeable screen sheet, and a first transparent sheet and second transparent sheet, each wider than the semipermeable screen sheet. The semipermeable screen sheet is sandwiched between the first and second transparent sheets. The display system further includes a human-being-sensing sensor placed on at least one the front and back of the screen unit, and a video projector for reversing a front and back of an image projected onto the screen unit in response to the human-being-sensing sensor.

If the observer moves to the front and the back of the screen unit, he or she can observe the normal image and more effective display is made possible from the viewpoint of business.

According to the invention, there is provided a display system including a screen unit including a polarization plate, a semipermeable screen sheet, and a first transparent sheet and second transparent sheet, each wider than the semipermeable screen sheet. The polarization plate and the semipermeable screen sheet are sandwiched between the first and second transparent sheets. The display system further includes a video projector for projecting an image by light in a polarization direction of the polarization plate.

Black floating, which means that outside light causes the black portion to become whitish for degrading the image contrast, is decreased and the contrast is improved to about twice.

According to the invention, there is provided a display system including a screen unit including a first total reflection screen sheet, a second total reflection screen sheet having the same shape as the first total reflection screen sheet, and a first transparent sheet and second transparent sheet, each wider than the first total reflection screen sheet. The first and second total reflection screen sheets are sandwiched between the first and second transparent sheets. The display system further includes a plurality of video projectors each for projecting an image onto each of the first and second total reflection screen sheets.

Different types of images can be displayed on the front and the back of the screen unit at the same time.

DETAILED DESCRIPTION OF THE PRESENT INVENTION

The present invention will be described with reference to the accompanying drawings.

First Embodiment

Figure 1A:
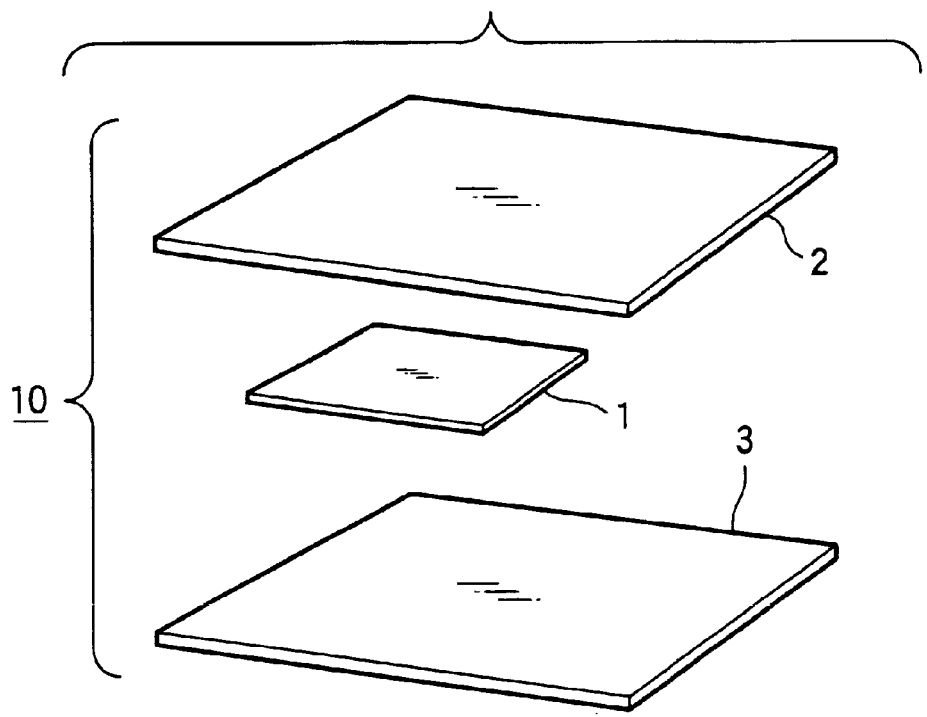
FIG. 1A is a drawing to represent the configuration of a screen unit in a first embodiment of the invention.

FIG. 1A is a drawing to represent configuration of a screen unit according to a first embodiment of the invention. In FIG. 1A, numeral 1 denotes a semipermeable screen sheet for transmitting and reflecting a projected image in a constant percentage (for example, transmitting light 60% and reflecting 40%), numeral 2 denotes a first transparent sheet such as an acrylic sheet wider than the semipermeable screen sheet 1, numeral 3 denotes a second transparent sheet which is the same as the first transparent sheet 2, and numeral 10 denotes a screen unit including the semipermeable screen sheet 1 sandwiched between the first transparent sheet 2 and the second transparent sheet 3. According to the configuration, the semipermeable screen sheet 1 can be fixed to a plane and is reinforced with the first transparent sheet 2 and the second transparent sheet 3, so that deformation of warpage or distortion of the screen unit 10 caused by the temperature difference is hard to occur.

Figure 1B:
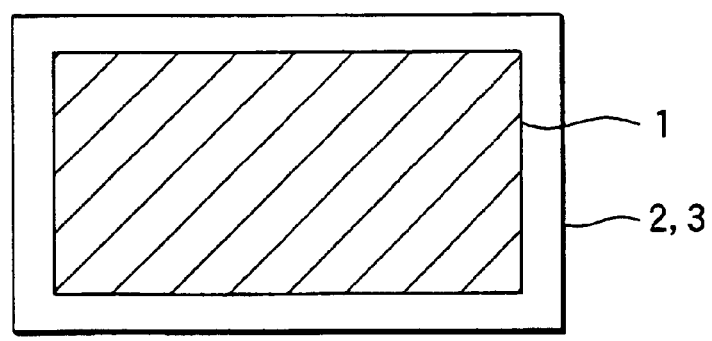
FIG. 1B is a front view of the screen unit in the first embodiment of the invention.

FIG. 1B is a front view of the screen unit in the embodiment. In the figure, since the first transparent sheet 2 and the second transparent sheet 3 are both wider than the semipermeable screen sheet 1, a transparent portion is provided in the surroundings of the semipermeable screen sheet 1 and if the projected image is larger than the semipermeable screen sheet 1, the image is displayed only on the semipermeable screen sheet 1, the visual effect of placing the image in a floating state on space is provided, and it becomes easy to match the image with the semipermeable screen sheet 1. If the semipermeable screen sheet 1 is formed to any desired shape such as a circle or a triangle, the image is projected fully to the desired shape.

Further, at least either of the first transparent sheet 2 and the second transparent sheet 3 is provided on a surface with an AR coat sheet or is subjected on a surface to AR treatment, whereby the direct reflectivity from the first transparent sheet 2 or the second transparent sheet 3 is decreased and glare can be lessened, so that the viewability of the screen unit can be improved and the presence of the first transparent sheet 2 or the second transparent sheet 3 can be made inconspicuous.

Second Embodiment

Figure 2:
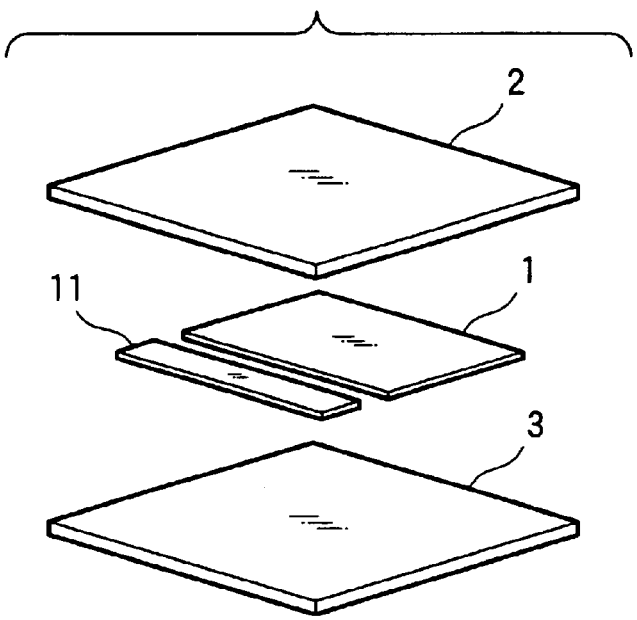
FIG. 2 is a developed view of a screen unit in a second embodiment of the invention.

FIG. 2 is a developed view of a screen unit according to a second embodiment of the invention. In FIG. 2, numeral 11 denotes a liquid crystal display sheet sandwiched between a first transparent sheet 2 and a second transparent sheet 3. According to the configuration, when a projected image is displayed on a semipermeable screen sheet 1, another information is displayed on the liquid crystal display sheet 11 in continuous-flow text, etc. Since multiple pieces of information can be provided at the same time and the information projected onto the semipermeable screen sheet 1 easily depends on the external environment of outside light, etc., only important information is displayed directly on the liquid crystal display sheet 11, thereby improving the information conveyance capability.

Third Embodiment

Figure 3:
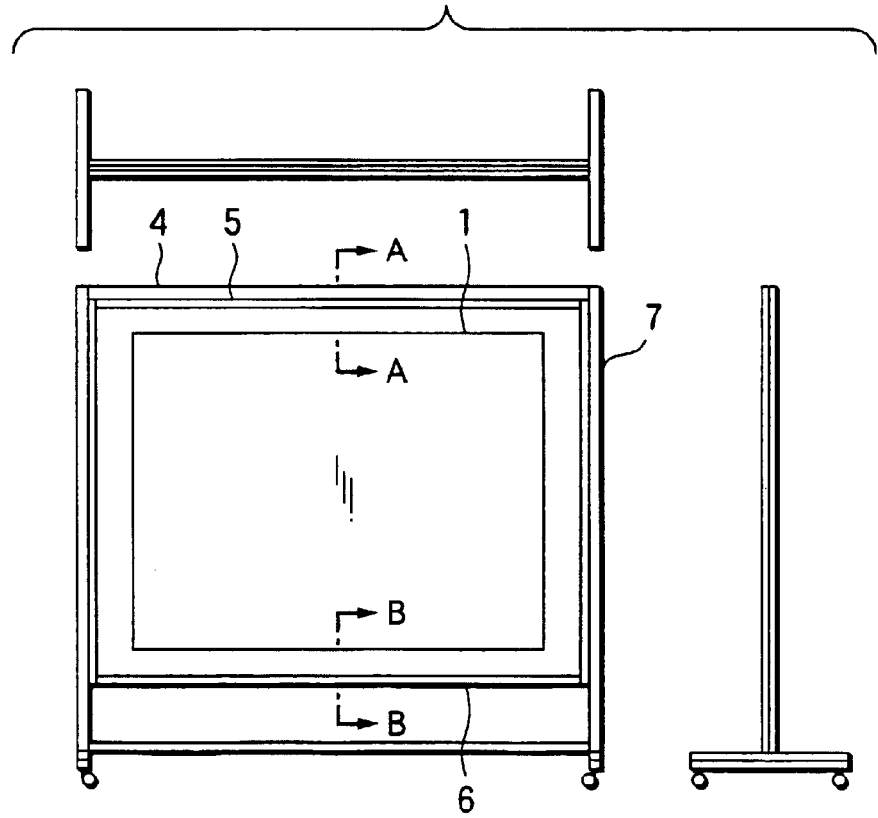
FIG. 3 is a three-view drawing of a screen unit attached to a cabinet in a third embodiment of the invention.

FIG. 3 is a three-view drawing of a screen unit attached to a cabinet according to a third embodiment of the invention. In FIG. 3, numeral 4 denotes a seal member for filling in surrounding gaps of a semipermeable screen sheet 1 produced when the semipermeable screen sheet 1 is sandwiched between a first transparent sheet 2 and a second transparent sheet 3. Numeral 5 denotes an upper screen frame for fixing the upper portion of the semipermeable screen sheet 1 with the first transparent sheet 2 and the second transparent sheet 3. Numeral 6 denotes a surrounding screen frame for holding the semipermeable screen sheet 1 without applying any force to the first transparent sheet 2, the second transparent sheet 3, or the seal member 4. Numeral 7 denotes a cabinet frame with a moving caster for holding the upper screen frame 5 and the surrounding screen frame 6, thereby holding a screen unit 10.

Since only the upper portion of the semipermeable screen sheet 1 is fixed, if a temperature difference occurs, the semipermeable screen sheet 1 receives a downward force under its own weight and holds a plane and wrinkles, etc., do not occur.

Figure 4A:
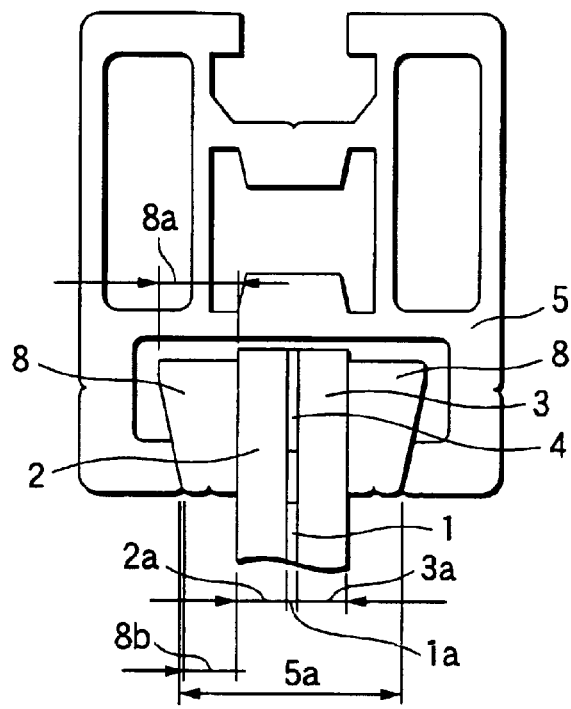
FIG. 4A is a sectional view taken along a line A—A in FIG. 3.
Figure 4B:
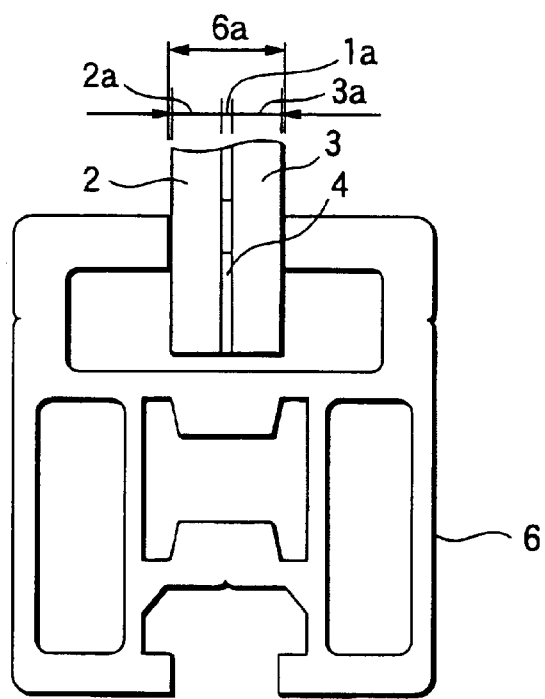
FIG. 4B is a sectional view taken along a line B—B in FIG. 3.

FIG. 4A is a sectional view taken along a line A—A in FIG. 3 and FIG. 4B is a sectional view taken along a line B—B in FIG. 3. In these figures, numeral 8 denotes a wedge member with an upper side length 8a of the cross section larger than a lower side length 8b of the cross section larger than a lower side length 8b and numeral 5a denotes the groove width of the upper screen frame 5. First, the wedge material 8 is applied to each of the first transparent sheet 2 and the second transparent sheet 3, between which the seal member 4 is sandwiched, and is fitted into the groove slitted in the lower portion of the upper screen frame 5. Next, receiving a force in a vertical direction under the weight of the semipermeable screen sheet 1, the first transparent sheet 2, and the second transparent sheet 3, the wedge member 8 is lowered and is pressed against the groove of the upper screen frame 5 and the force pinching the first transparent sheet 2 and the second transparent sheet 3 is increased. The upper portion of the semipermeable screen sheet 1 is fixed with the first transparent sheet 2 and the second transparent sheet 3 by the pinching force of the wedge member 8. The wedge member 8 has a tape structure and is in surface contact with the groove of the upper screen frame 5 and uniform pressure is applied to the first transparent sheet 2 and the second transparent sheet 3 and thus a disadvantage that the wedge member 8 is detached because of swinging or vibration does not occur.

In the configuration, the following relation holds:

$$2 \times 8b + 2a + 1a + 3a \leq 5a \leq 2 \times 8a + 2a + 1a + 3a,$$

where 1a is the thickness of the semipermeable screen sheet 1, 2a is the thickness of the first transparent sheet 2, and 3a is the thickness of the second transparent sheet 3.

After the semipermeable screen sheet 1 is fixed under its own weight, the wedge member 8 and the upper screen frame 5 are fixed by a screw, etc., considering vibration, etc., when the screen unit is moved, etc.

As for a fixing method of any other portion than the upper portion of the semipermeable screen sheet 1, the relation of $2a + 1a + 3a \leq 6a$ holds where 6a is the groove width of the surrounding screen frame 6, and the surrounding screen frame 6 holds the semipermeable screen sheet 1 to such an extent that swinging and vibration of the semipermeable screen sheet 1 are suppressed without applying a force.

According to the fixing method, only the upper portion of the semipermeable screen sheet 1 is fixed under its own weight and if a temperature difference occurs, the semipermeable screen sheet 1 is expanded or shrunk between the first transparent sheet 2 and the second transparent sheet 3 and can hold a plane without any wrinkles. A vacuum is produced in the space between the seal member 4 and the semipermeable screen sheet 1, whereby the intimate contact property between the semipermeable screen sheet 1 and the first transparent sheet 2 and the second transparent sheet 3 can be enhanced.

Figure 5:
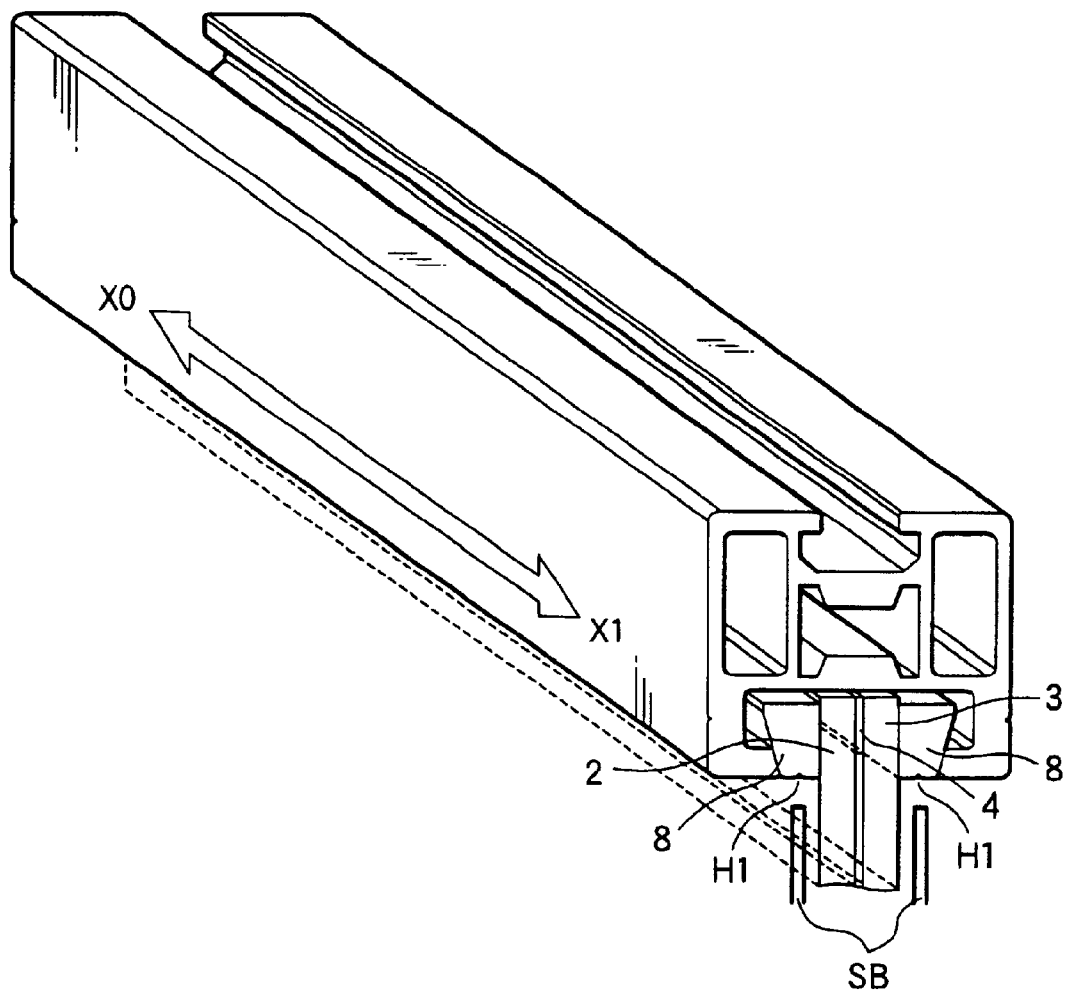
FIG. 5 shows a combined structure of an actual upper screen frame 5 and an actual semipermeable screen sheet 1.

FIG. 5 shows a combined structure of the actual upper screen frame 5 and the actual semipermeable screen sheet 1. With the structure, because of one-side hanging, if the screen unit 10 is carried transversely at the transport time, etc., the wedge member 8, the first transparent sheet 2, and the second transparent sheet 3 rub against each other and flaws are produced and thus the screen unit 10 cannot be transported. As a precaution against it, the wedge of the wedge member 8 is tapped at fixed points H1 and the screen unit 10 is completely fixed by holding screws SB. At the assembling time in the field, the holding screws SB are loosened two or three threads for freeing the screen unit 10. If the screen unit 10 which is freed is thermally expanded or shrunk in X0<->X1 direction, distortion can be lessened. Because of this reason, basically four-side free frame with one-side hanging is made possible and thermal distortion can be decreased up and down and from side to side.

Fourth Embodiment

Figure 6:
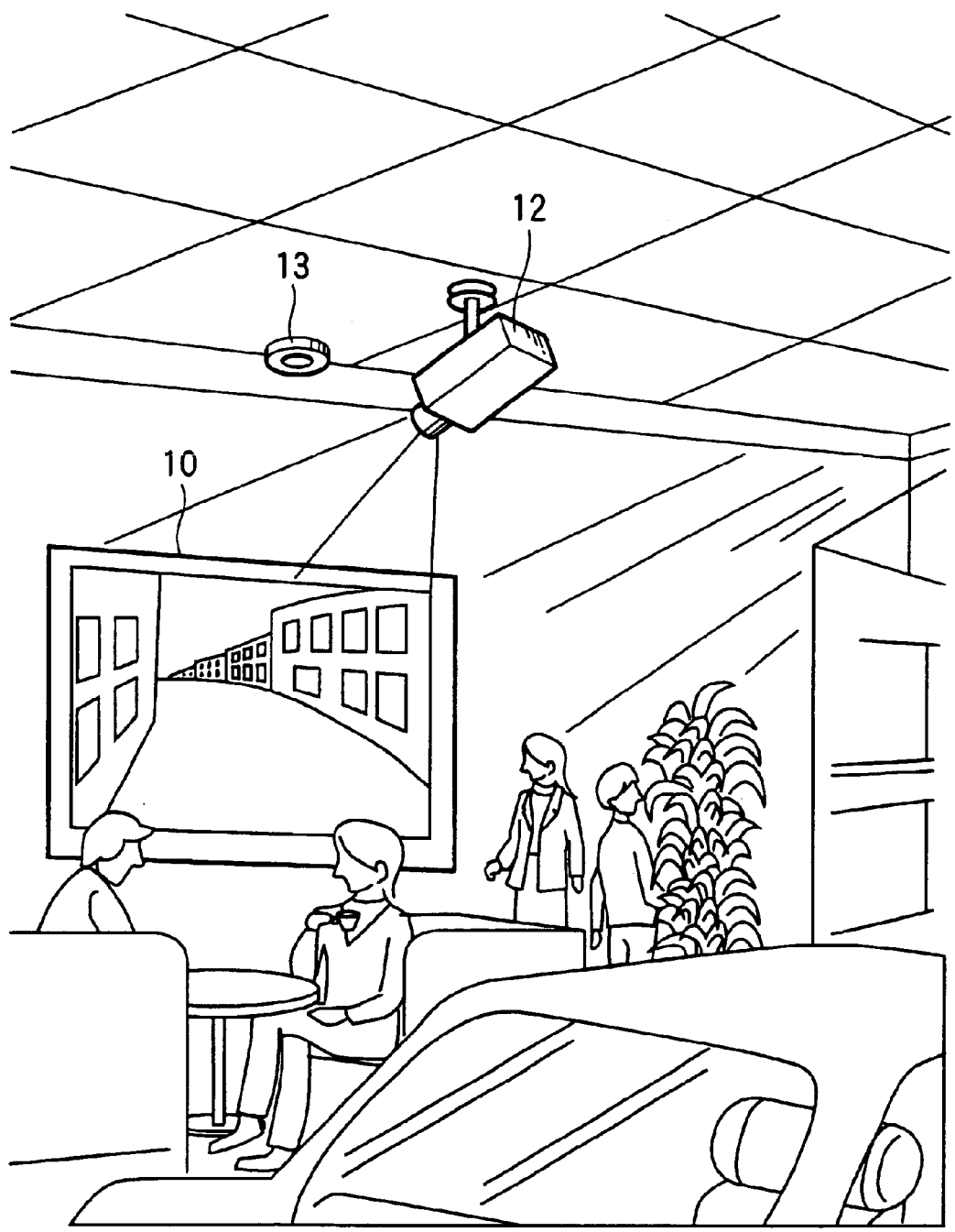
FIG. 6 is a schematic drawing to represent a display system including a display unit 10 of the invention used in a showroom.

FIG. 6 is a schematic drawing to represent a display system including a display unit 10 of the invention used in a showroom. In FIG. 6, numeral 12 denotes a liquid crystal projector and numeral 13 denotes a human-being-sensing sensor being installed in a showroom for sensing the presence of a human being by infrared radiation or temperature sensing.

The screen unit 10 is installed touching a show window facing the outside of the showroom and an image of the liquid crystal projector 12 is observed as a reflected image in the showroom and a transmitted image outside the showroom. If the human-being-sensing sensor 13 senses the presence of a human being in the showroom, the liquid crystal projector 12 projects the image with the reflected image as the normal image. If the human-being-sensing sensor 13 does not sense any human being and no human beings exist in the showroom, the front and the back of the image are reversed for projection so that the transmitted image is made the normal image.

According to the described configuration, if no human beings exist in the showroom, public relations of commodities are conducted aggressively for the external pedestrians, etc., through the show window; if a customer who has a stronger will to purchase exists in the showroom, the image viewed in the showroom can be made the normal image and inversion of characters, etc., can be eliminated.

The human-being-sensing sensor 13 may be installed outside the showroom and a display system may be adopted wherein the human-being-sensing sensor 13 is installed inside and outside the showroom and which of the front and back images the liquid crystal projector 12 is to project is determined depending on the number of existing persons.

Fifth Embodiment

Figure 7:
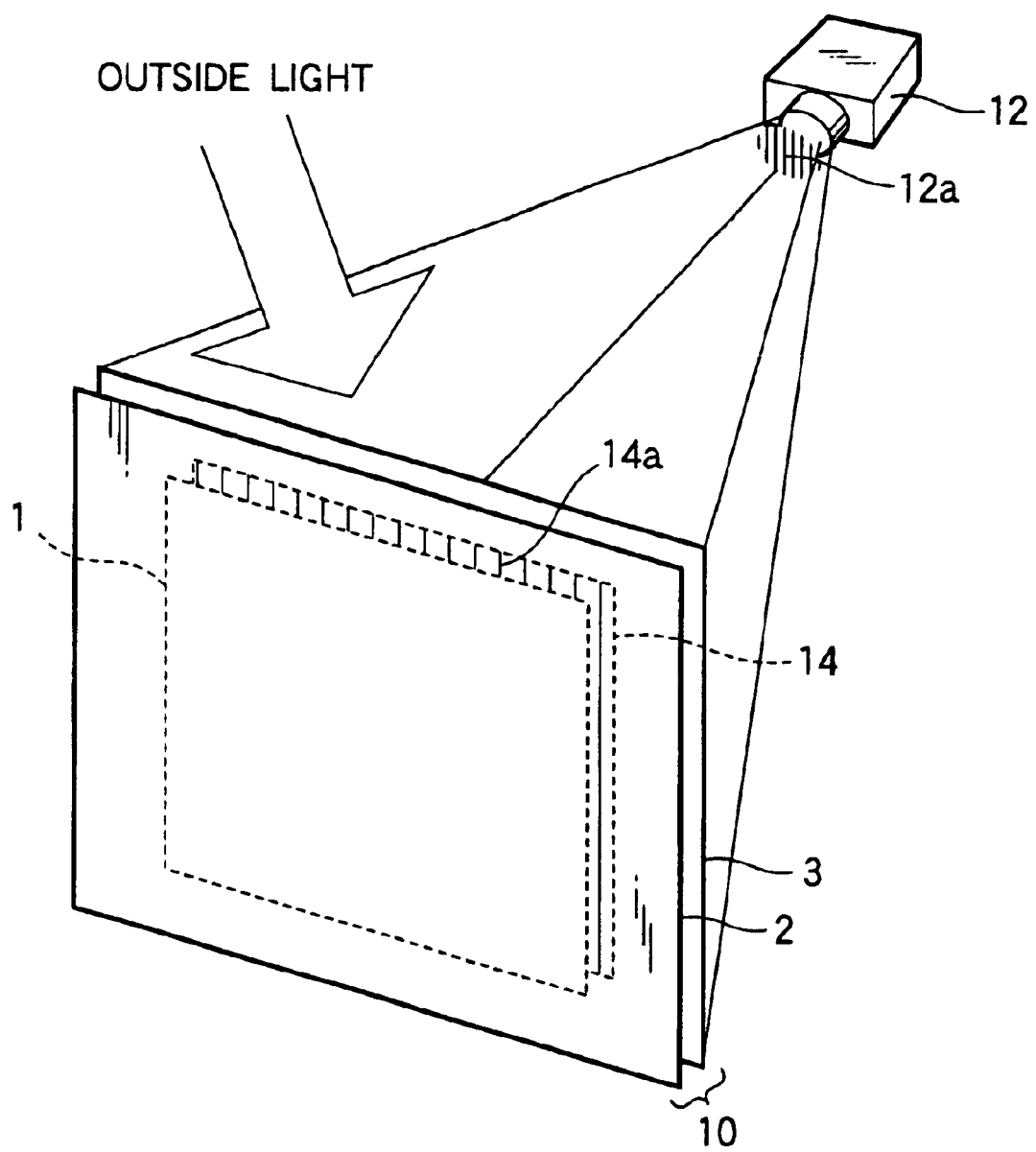
FIG. 7 is a schematic drawing of a display system in a fifth embodiment of the invention.

FIG. 7 is a schematic drawing of a display system according to a fifth embodiment of the invention. In FIG. 7, numeral 14 denotes a polarization plate superposed on a semipermeable screen sheet 1 on the projection side of a liquid crystal projector 12 and having a predetermined polarization direction 14a. In the display system, the liquid crystal projector 12 allows a light source to pass through a liquid crystal sheet for converting the light polarization direction for displaying an image and thus projection light has a predetermined polarization direction 12a. The polarization direction 14a of the polarization plate 14 matches the polarization direction 12a. According to the configuration, a half of outside light from the projection direction cannot be transmitted on the polarization plate 14 and the projection light of the liquid crystal projector 12 can be transmitted. Accordingly, black floating, which means that outside light causes the black portion to become whitish for degrading the image contrast, is decreased and the contrast is improved to about twice.

Sixth Embodiment

Figure 8A:
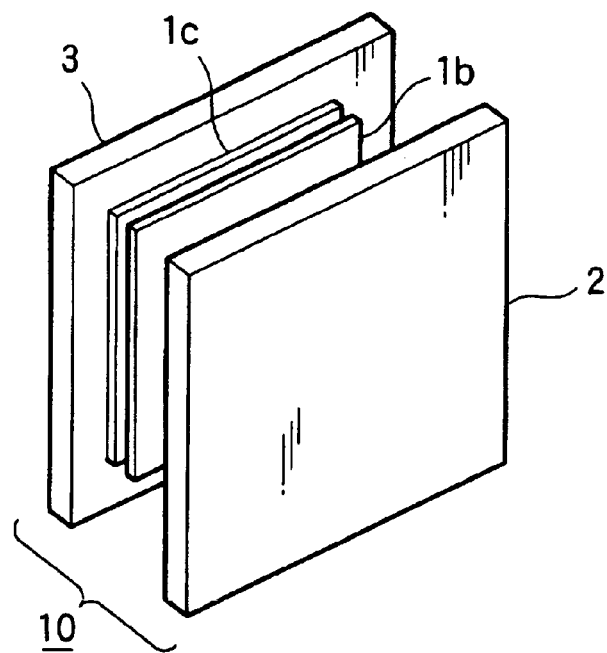
FIG. 8A is a developed view of a screen unit 10 in a sixth embodiment of the invention.
Figure 8B:
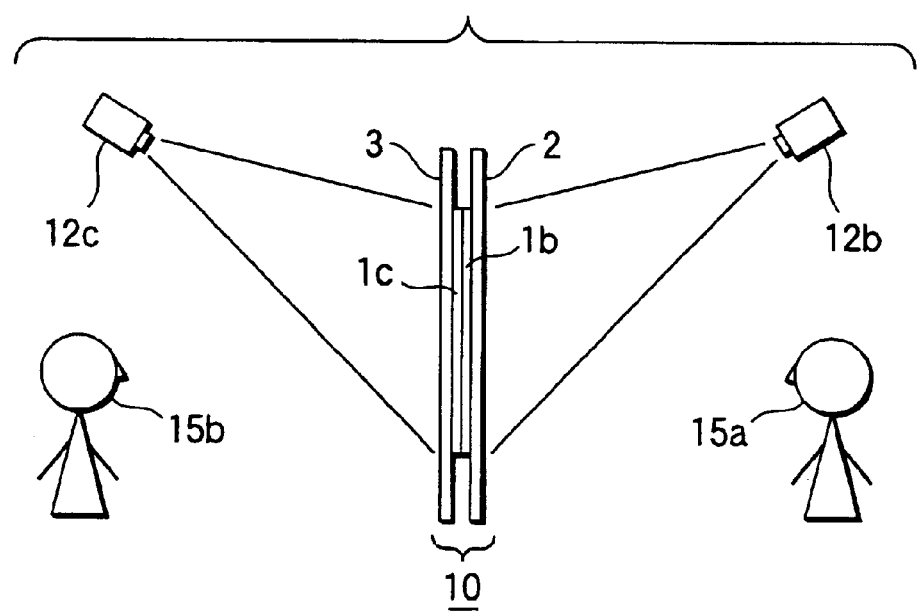
FIG. 8B is a schematic drawing to show a use method of the screen unit 10 in the sixth embodiment of the invention.

FIG. 8A is a developed view of a screen unit 10 according to a sixth embodiment of the invention. In FIG. 8A, a total reflection screen sheet 1b and a full reflection screen sheet 1c each having high reflectivity are superposed on each other and are sandwiched between a first transparent sheet 2 and a second transparent sheet 3. FIG. 8B is a schematic drawing to show a use method of the screen unit 10 in the sixth embodiment. An image projected from a liquid crystal projector 12b is viewed by an observer 15a and an image projected from a liquid crystal projector 12c is viewed by an observer 15b. The described configuration makes it possible to display different images on the front and the back of one screen unit 10.

What is claimed is:

1. A screen unit comprising:
   a screen sheet; and
   a first transparent sheet and a second transparent sheet, each wider than the screen sheet and detachable from the screen sheet,
   wherein the screen sheet is sandwiched between the first transparent sheet and the second transparent sheet.

2. The screen unit as claimed in claim 1, wherein the screen sheet comprises a plurality of screen sheets.

3. The screen unit as claimed in claim 2, wherein the plurality of screen sheets are of the same type.

4. The screen unit as claimed in claim 2, wherein the plurality of screen sheets are different in type from each other.

5. The screen unit as claimed in claim 1, wherein the screen sheet is semipermeable.

6. The screen unit as claimed in claim 1, wherein the screen sheet is a total reflection sheet.

7. The screen unit as claimed in claim 1, wherein the screen sheet has an upper portion fixed by the first and the second transparent sheets.

8. The screen unit as claimed in claim 7, wherein the upper portion is fixed by the first and the second transparent sheets due to the weight of the screen sheet and the first and the second transparent sheets.

9. The screen unit as claimed in claim 8, further comprising:
   a wedge member having an upper side of a cross section being larger than a lower side thereof;
   a seal member applied to a periphery outer than the screen sheet between the first and second transparent sheets; and
   a screen frame having a groove spaced by a predetermined distance, the groove being for pinching the wedge member and the first and the second transparent sheets.

10. The screen unit as claimed in claim 1, wherein at least one of the first and the second transparent sheets has an antireflective coat sheet on a surface thereof or is subjected to antireflective treatment on the surface thereof.

11. The screen unit as claimed in claim 1, wherein a liquid crystal display section is further sandwiched between the first and second transparent sheets.

12. A display system comprising:
   a screen unit including:
      a semipermeable screen sheet, and
      a first transparent sheet and a second transparent sheet, each wider than the semipermeable screen sheet,
      wherein the semipermeable screen sheet is sandwiched between the first and second transparent sheets;
   a human-being-sensing sensor placed on at least one of the front and back of the screen unit; and
   a video projector for reversing a front and back of an image projected onto the screen unit in response to the human-being-sensing sensor.

13. A display system comprising:
   a screen unit including
      a polarization plate;
      a semipermeable screen sheet; and a first transparent sheet and a second transparent sheet, each wider than the semipermeable screen sheet and detachable from the semipermeable screen sheet, wherein the polarization plate and the semipermeable screen sheet are sandwiched between the first and second transparent sheets; and a video projector for projecting an image by light in a polarization direction of the polarization plate.

14. A display system comprising:

a screen unit including
  a first total reflection screen sheet;
  a second total reflection screen sheet having the same shape as the first total reflection screen sheet; and
  a first transparent sheet and a second transparent sheet, each wider than the first total reflection screen sheet, the first and second total reflection screen sheets sandwiched between the first and second transparent sheets and detachable from the first and second transparent sheets; and a plurality of video projectors each for projecting an image onto each of the first and the second total reflection screen sheets.

15. A method for displaying an image on a screen unit using a projector, comprising:

sensing a human being using a human-being-sensing sensor placed in proximity of the screen unit;

determining a location of the human being with reference to the screen unit; and reversing a front and back of the image projected onto the screen unit in response to the location of the human being.

* * * * *